(12) United States Patent
Jones et al.

(10) Patent No.: US 8,722,753 B2
(45) Date of Patent: May 13, 2014

(54) HYDROXYL TERMINATED PRECURSOR AND METHOD OF MAKING THE SAME

(75) Inventors: Thomas N. Jones, Pinckney, MI (US); Edmund J. Madaj, Manchester, MI (US)

(73) Assignee: Lear Corporation, Southfield, MI (US)

( * ) Notice: Subject to any disclaimer, the term of this patent is extended or adjusted under 35 U.S.C. 154(b) by 816 days.

(21) Appl. No.: 11/842,903

(22) Filed: Aug. 21, 2007

(65) Prior Publication Data

US 2009/0054611 A1    Feb. 26, 2009

(51) Int. Cl.
*C08G 18/00* (2006.01)
*C08L 91/00* (2006.01)

(52) U.S. Cl.
USPC ........... 521/174; 521/137; 521/155; 521/156; 521/157; 521/159; 521/160; 521/170; 521/172; 528/74.5

(58) Field of Classification Search
USPC ............. 528/74.5, 76, 85; 521/137, 155, 156, 521/157, 159, 160, 170, 172, 174; 560/25, 560/26, 158, 345
See application file for complete search history.

(56) References Cited

U.S. PATENT DOCUMENTS

| | | | | |
|---|---|---|---|---|
| 4,025,670 A | * | 5/1977 | Webster et al. | 427/231 |
| 4,546,120 A | * | 10/1985 | Peerman et al. | 521/159 |
| 5,990,257 A | * | 11/1999 | Johnston et al. | 528/28 |
| 6,359,023 B1 | * | 3/2002 | Kluth et al. | 521/155 |
| 7,084,230 B2 | * | 8/2006 | Kurth et al. | 528/74.5 |
| 7,700,661 B2 | * | 4/2010 | Griggs | 521/170 |
| 2004/0209971 A1 | | 10/2004 | Kurth et al. | |
| 2005/0070620 A1 | * | 3/2005 | Herrington et al. | 521/155 |
| 2006/0235100 A1 | * | 10/2006 | Kaushiva et al. | 521/172 |
| 2006/0270747 A1 | | 11/2006 | Griggs | |
| 2007/0049719 A1 | | 3/2007 | Brauer et al. | |
| 2008/0004361 A1 | * | 1/2008 | Palermo | 521/160 |
| 2008/0096995 A1 | * | 4/2008 | Bedri et al. | 521/160 |

FOREIGN PATENT DOCUMENTS

CN    1919891 A    2/2007
(Continued)

OTHER PUBLICATIONS

Petrovic et al., Effect of OH/NCO Molar Ratio on Properties of Soy-Based Polyurethane Networks. Apr. 2002, Journal of Polymers and the Environment. vol. 10, Nos. 112.*

(Continued)

*Primary Examiner* — Michael L Leonard
(74) *Attorney, Agent, or Firm* — Brooks Kushman P.C.

(57) ABSTRACT

A method of making a hydroxyl terminated precursor for polyurethane is disclosed. The method comprises heating a vegetable oil-polyol mixture of modified vegetable oil containing about two or more hydroxyl groups per molecule and a polyether polyol having about two or more hydroxyl groups per molecule at a temperature of at least about 25 degrees Celsius and at a pressure of about 1 atmosphere. The mixture has a hydroxyl equivalent ratio of about 1:1 vegetable oil to polyol. The method further comprises mixing for at least about 10 minutes an isocyanate containing about two or more isocyanato groups per molecule at least about 25 degrees Celsius to the vegetable oil-polyol mixture at a molar equivalent ratio of at least 2:1 vegetable oil-polyol mixture to isocyanate to react the isocyanate with the mixture to form the hydroxyl terminated precursor.

22 Claims, 1 Drawing Sheet

(56) References Cited

FOREIGN PATENT DOCUMENTS

| | | |
|---|---|---|
| EP | 1 712 576 A1 | 10/2006 |
| EP | 1 712 578 A1 | 10/2006 |
| WO | 2005033167 A2 | 4/2005 |
| WO | 2006094227 A2 | 9/2006 |
| WO | 2007111828 A2 | 10/2007 |
| WO | 2007127379 A1 | 11/2007 |
| WO | 2008063594 A1 | 5/2008 |

OTHER PUBLICATIONS

Paint and Coating testing manual: 14$^{th}$ Edition. Joseph V. Kolenke Editor. p. 91.*
Luciane L. Monteavaro et al.—"Polyurethane Networks from Formiated Soy Polyols: Synthesis and Mechanical Characterization", XP-002501194—JAOCS, vol. 82, No. 5 (2005), pp. 365-371.
German Office Action Dated Feb. 8, 2012, Application No. 11 2008 002 271.2, Applicant Lear Corporation.

* cited by examiner (Prior Art)
Fig. 1a

Fig. 1b

HYDROXYL TERMINATED PRECURSOR AND METHOD OF MAKING THE SAME

FIELD OF THE INVENTION

The present invention relates to hydroxyl terminated precursors and methods of making hydroxyl terminated precursors.

BACKGROUND OF THE INVENTION

Due to their widely ranging mechanical properties and their ability to be relatively easily machined and formed, plastic foams and elastomers have found wide use in a multitude of industrial and consumer applications. In particular, urethane foams and elastomers have been found to be well suited for many applications. Automobiles, for instance, contain a number of components, such as cabin interior parts, that are comprised of urethane foams and elastomers. Such urethane foams are typically categorized as flexible, semi-rigid, or rigid foams with flexible foams generally being softer, less dense, more pliable, and more subject to structural rebound subsequent to loading than rigid foams.

Urethanes (or more accurately for polymers, polyurethanes,) are formed when isocyanate (NCO) groups (or A-side reactants) react with hydroxyl (OH) and other active hydrogen groups (or B-side reactants). Specifically, a carbamate linkage (or urethane bond) is formed upon the reaction between an isocyanate group and a hydroxyl group. The polyurethane polymer-forming reaction occurs between substances with more than one isocyanate group per molecule (or A-side reactants) and substances with more than one hydroxyl or other active hydrogen group per molecule (B-side reactants). The most common method of polyurethane production is via the reaction of a polyol (a B-side reactant) and an isocyanate (an A-side reactant) which forms the backbone urethane group. A cross-linking agent may also be added. Depending on the desired qualities of the final polyurethane product, the precise formulation may be varied. Variables in the formulation include the type and amounts of each of the reactants.

Although vegetable-based polyurethane foams have been used in various polyurethane foam markets, the use of vegetable-based polyurethane foam has not gain acceptance in industries, such as the automotive industry. For example, vegetable-based polyurethanes have not been able to meet specification requirements for use in automotive interior components.

Thus, there is a need to provide a high quality polyurethane product made from a relatively high level of bio-based raw materials.

BRIEF SUMMARY OF THE INVENTION

The present invention generally provides a hydroxyl terminated precursor to be used in making a relatively high quality polyurethane product. The hydroxyl terminated precursor is made from a relatively high level of bio-based raw materials. In accordance with another example of the present invention, the hydroxyl terminated precursor may be then used as the B-side reactant to make a polyurethane product or foam. The hydroxyl terminated precursor may be reacted with an A-side reactant from standard petrochemical isocyanates to produces a relatively high quality polyurethane foam. Depending on the choice of isocyanate and polyols, the foam is suitable for a number of applications ranging from automotive seating to rigid structural urethane parts. It is to be understood that the terms "isocyanato group" and "isocyanate group" are used interchangeably in this application.

In one example, the present invention provides a method of making a hydroxyl terminated precursor for polyurethane. The method comprises heating a vegetable oil-polyol mixture of modified vegetable oil containing about two or more hydroxyl groups per molecule and a polyether polyol having about two or more hydroxyl groups per molecule at a temperature of at least about 25 degrees Celsius and at a pressure of about 1 atmosphere. The mixture has a hydroxyl equivalent ratio of about 1:1 vegetable oil to polyol. The method further comprises mixing for at least about 10 minutes an isocyanate containing about two or more isocyanato groups per molecule at least about 25 degrees Celsius to the vegetable oil-polyol mixture at a molar equivalent ratio of at least 2:1 vegetable oil-polyol mixture to isocyanate. This reacts the isocyanate with the mixture to form the hydroxyl terminated precursor.

In another example, the present invention provides a compound of formula A wherein
R'=

In yet another example, the present invention provides a compound of formula A as follows:

A is wherein
R is

In still another example, the present invention provides a compound of formula A as follows:

A is wherein R' is and
R is

In yet another example, the present invention provides a method of making a hydroxyl terminated precursor for polyurethane. The method comprises heating a vegetable oil-polyol mixture of modified vegetable oil containing about two or more hydroxyl groups per molecule and a polyether polyol having about two or more hydroxyl groups per molecule at a temperature of at least about 25 degrees Celsius and at a pressure of about 1 atmosphere. The mixture having a hydroxyl equivalent ratio of about 1:1 vegetable oil to polyol.

The present invention further comprises adding an isocyanate containing about two or more isocyanato groups per molecule to the vegetable oil-polyol mixture. The isocyanate is at least about 25 degrees Celsius to the mixture at a molar equivalent ratio of at least 2:1 vegetable oil-polyol mixture to isocyanate. The method further comprises mixing the isocyanate and the vegetable oil-polyol mixture to react the isocyanate with the mixture for at least about 10 minutes to form the hydroxyl terminated precursor. The method further comprises adding additional polyol to the isocyanate and the vegetable oil-polyol mixture.

Still another example of the present invention includes a method of making a polyurethane product from a hydroxyl terminated precursor. The method comprises making the hydroxyl terminated precursor, and then adding one or more additives that may be catalysts or other additives and possibly additional polyol to comprise the B-side reactants. The method further comprises mixing an isocyanate or isocyanates as the A-side reactants with the B-side reactants in a weight ratio so that the isocyanate content of the A-side reactants in equivalent units is between about 60:100 and 100:80 to the active hydrogen content in equivalent units in the B-side reactants. The base isocyanate (A-side reactant or reactants) is mixed with the B-side reactant or reactants containing the hydroxyl terminated precursor at a predetermined pressure and a temperature of between about 20 and 50 degrees Celsius, defining a liquid polyurethane mixture. The method further comprises reacting the polyurethane mixture in situ to form the polyurethane product.

Further aspects, features, and advantages of the invention will become apparent from consideration of the following description and the appended claims when taken in connection with the accompanying drawings.

DETAILED DESCRIPTION OF THE INVENTION

Examples of the present invention provide a hydroxyl terminated precursor, methods of making a hydroxyl terminated precursor for polyurethane, and methods of making a polyurethane foam from a hydroxyl terminated precursor. In one example, hydroxyl groups (—OH) on two precursor substances react with isocyanato groups (—NCO) on a third precursor substance to form carbamate linkages (—NH-COO—). The hydroxyl-containing precursor substances are used in excess so that molecules of the hydroxyl terminated precursor (a new chemical substance) contain, on average, two carbamate groups and at least two hydroxyl groups.

In accordance with one example, the present invention provides a method of making a hydroxyl terminated precursor for polyurethane. The method comprises providing a modified vegetable oil comprising hydroxyl groups. For example, the modified vegetable oil may be any suitable oil having hydroxyl groups, or modified to contain hydroxyl group, such as a modified soybean oil (polymerized, oxidized), palm oil, canola oil, rapeseed oil, castor oil, or olive oil. Any other modified non-petroleum based oil may be used without falling beyond the scope or spirit of the present invention.

In this example, the modified vegetable oil is a modified soybean oil (polymerized, oxidized). Soybean oil, and other plant based oils, is a mixture of triglycerides, i.e., triesters of glycerol and fatty acids. A triglyceride may have the general structure as follows:

where $R^1$, $R^2$, and $R^3$ can have any of a number of structures. A naturally occurring triglyceride typically exists as a mixture of different structures in which $R^1$, $R^2$, and $R^3$ vary from structure to structure.

A fatty acid is a carboxylic acid and may have a general formula of $HO_2CR$, where R is usually an unbranched aliphatic chain attached to a carboxyl group. The chain may contain double or triple bonds. Other functional groups may also be present, such as hydroxyl groups, as in ricinoleic acid.

The most common R groups in vegetable oils are listed in Table 1 below as follows:

TABLE 1

| R | Name of Fatty Acid Containing R |
|---|---|
| $(CH_2)_2CH_3$ | Butyric |
| $(CH_2)_4CH_3$ | Caproic |
| $(CH_2)_6CH_3$ | Caprylic |
| $(CH_2)_8CH_3$ | Capric |
| $(CH_2)_{10}CH_3$ | Lauric acid |
| $(CH_2)_{12}CH_3$ | Myrisitc |
| $(CH_2)_{14}CH_3$ | Palmitic |
| $(CH_2)_{16}CH_3$ | Stearic |
| $(CH_2)_{18}CH_3$ | Arachidic |
| $(CH_2)_{20}CH_3$ | Behenic |
| $(CH_2)_7CH{=}CH(CH_2)_3CH_3$ | Myristoleic |
| $(CH_2)_7CH{=}CH(CH_2)_5CH_3$ | Palmitoleic |
| $(CH_2)_7CH{=}CH(CH_2)_7CH_3$ | Oleic |
| $(CH_2)_7CH{=}CHCH_2CH{=}CH(CH_2)_4CH_3$ | Linoleic |
| $(CH_2)_7CH{=}CHCH_2CH{=}CHCH_2CH{=}CHCH_2CH_3$ | Linolenic |
| $(CH_2)_3CH{=}CHCH_2CH{=}CHCH_2CH{=}CHCH_2CH{=}CH(CH_2)_4CH_3$ | Arachidonic |
| $(CH_2)_7CH{=}CHCH_2CH(OH)(CH_2)_5CH_3$ | Ricinoleic |

It is to be noted that Table 1 is not exhaustive and that a number of other fatty acids may be present in triglycerides without falling beyond the scope or spirit of the present invention.

When a plant based oil is exposed to oxidizing agents, especially with added heat or ultraviolet light, the R groups can react to form a number of other structures. The positions of double bonds may change, and polymerization may occur via free radical, ionic, or electrocyclic reactions. Hydroxyl groups may also be introduced into the molecule.

The chemical structure of oxidized, polymerized soybean oil may be generally described as follows:

where $R^1$, $R^2$, and $R^3$ are groups derived from the original R groups of the starting triglyceride; $A^1$, $A^2$, and $A^3$ are chemically bonded to $R^1$, $R^2$, and $R^3$, and may be hydroxyl or other triglyceride moieties whose R groups themselves may have undergone similar reactions to those undergone by $R^1$, $R^2$, and $R^3$; and x, y, and z may be any whole number 0 or above, but will usually be 0, 1, or 2. Moreover, if x is 2 or greater, $A^1$ may represent two or more different groups, for example, a hydroxyl group and a triglyceride moiety, or a triglyceride moiety that contains hydroxyl groups. Furthermore, the same is for y and z.

Examples of structures generally having the above description include as follows, but are not limited to:

More specifically, the modified soybean oil (polymerized, oxidized) may be Soyol™ R2-052, a di-functional, 52 hydroxyl number biobased polyol suitable for urethane applications and manufactured by Urethane Soy Systems Company of Volga, S. Dak.

The method further comprises providing a polyol, preferably a polyether polyol. For example, a general description of a polyether polyol that may be used in accordance with an example of the present invention includes polymers formed by the addition of alkylene oxide monomers to an initiator compound containing two or more active hydrogen atoms. That is, the active hydrogen compound in the presence of a catalyst initiates a ring opening and an oxide addition, which continue until the desired molecular weight is obtained. In one example, the preferred alkylene oxides are propylene oxide and ethylene oxide. Polymers may be formed from one or more of the following or similar initiators: water, ethylene glycol, propylene glycol, dipropylene glycol, glycerine, trimethylolpropane, ethylene diamine, pentaerythritol, diethylene triamine, sorbitol, and sucrose. Example of some trade names for the polyols described above and useful in this invention are: Dow Chemical's Voranol™ 5815, Voractiv™ DVV6340, Voranol™ 4240; Bayer MaterialScience's Multranol™ 3901 and BASF's Pluracol™ 1596. Furthermore, graft (or "filled") copolymer polyol produced by free radical polymerization of styrene and acrylonitrile ("SAN") in situ with a polyether polyol have proven to be useful in this invention; Dow Chemical's Specflex™ NC701 and BASF Pluracol™ 1528 are examples of these type of polyols. Another class of copolymer polyol suitable in this example may be produced by the step-growth polymerization of hydrazine with tolylene diisocyanate or alkanolamine with an isocyanate in the presence of a polyether polyol; an example of the former is Bayer MaterialScience's Multranol™ 9151.

The polyol used herein may be an ethylene oxide-propylene oxide copolymer polyether polyol with average functionality (number of hydroxyl groups per molecule) greater than 1 and less than about 5. The molecular weight may be between about 200 and about 6500. Preferably, the polyol is a polypropylene glycol (diol or triol) with a molecular weight between about 400 and 3000. For example, polyols with a tradename of Pluracol™ P410R by BASF, Pluracol™ P1010 by BASF, Voranol™ 220-110 by Dow, and Voranol™ 230-238 by Dow may be used.

The modified vegetable oil containing about two or more hydroxyl groups per molecule is then mixed with the polyol having about two or more hydroxyl groups per molecule to define a vegetable oil-polyol mixture. In this example, the mixture has a hydroxyl equivalent ratio of about 1:1 vegetable oil to polyol. Preferably, the vegetable oil-polyol mixture is heated to a temperature of at least about 25 degrees Celsius and at a pressure of about 1 atmosphere. More preferably, the vegetable oil-polyol mixture is heated to a temperature of between about 35 and 50 degrees Celsius.

The method further comprises providing an isocyanate containing about two or more isocyanato groups per molecule. In one embodiment, the isocyanate may be any suitable isocyanate such as one of 1,1'-methylenebis[isocyanatobenzene] (MDI), polymethylenepolyphenylene isocyanate (polymeric MDI), and all isomers and isomer ratios of toluene diisocyanate (TDI). Other isocyanates may be use without falling beyond the scope or spirit of the present invention. The isocyanate is heated to a temperature of at least about 25 degrees Celsius, preferably between about 25 and 60 degrees Celsius, and more preferably between about 35 and 50 degrees Celsius at a pressure of preferably about 1 atmosphere.

The isocyanate is added to the vegetable oil-polyol mixture at a molar equivalent ratio of at least 2:1 vegetable oil-polyol mixture to isocyanate. The isocyanate is then mixed with the vegetable oil-polyol mixture for at least about 10 minutes to react the isocyanate with the mixture, thereby forming the hydroxyl terminated precursor. The mixing of the isocyanate and the vegetable oil-polyol mixture reacts the isocyanate with the vegetable oil-polyol mixture to define the hydroxyl terminated precursor in a reaction as follows:

where n, m ≥ 1 wherein R is a polyoxypropylene polymer or polyoxyethylene-polyoxypropylene polymer group; R' is a modified vegetable oil group; and Ar is a bisphenyl methylene or methylbenzene group.

Additional polyol may then be added and mixed with the vegetable oil-polyol mixture and isocyanate. In this example, up to about 500 weight percent based on vegetable oil content of a polyoxyethylene-oxypropylene copolymer polyol may be added after mixing the isocyanate with the mixture. However, other polyols may be used as provided above without falling beyond the scope or spirit of the present invention.

Catalyst(s) may then be added in accordance with one example of the present invention. The catalysts added may include tertiary amines such as triethylamine, tributylamine, N-methylmorpholine, N-ethylmorpholine, N-cocomorpholine, N,N,N',N'-tetramethyl-ethylenediamine, 1,4-diazabicyclo-(2,2,2)-octane (DABCO), N-methyl-N'-dimethylaminoethylpiperazine, N,N-dimethyl-benzylamine, bis-(N,N-diethylaminoethyl)adipate, N,N-diethylbenzylamine, pentamethyl diethylenetriamine, N,N-dimethylcyclohexylamine, N,N,N',N'-tetramethyl-1,3-butanediamine, N,N-dimethyl-β-phenylethylamine, 1,2-dimethylimidazole, 2-methylimidazole, 3-[2-(dimethylamino)ethoxy]-N,N-dimethylpropylamine, N,N,N',N'-tetramethyl-2,2'-oxybis(ethylamine), 2,4,6-tris(dimethylaminomethyl)phenol, 1,3-bis (dimethylamino)-2-propanol, diazabicyclo[5.4.0]undec-7-ene (DBU) and the like.

Also useful are commercially available delayed action catalysts such as 1-(2-hydroxypropyl)imidazole formic acid salt; 2-[[2-(dimethylamino)ethyl]methylamino]ethanol formic acid salt; bis(2-dimethylaminoethyl) ether diformate; N,N,N',N'-tetramethyl-1,2-ethanediamine formic acid salt; 1,8-diazabicyclo[5.4.0]undec-7-ene 2-ethylhexanoic acid salt; 1,8-diazabicyclo[5.4.0]undec-7-ene phenol salt; and the like. Mannich bases known per se obtained from secondary amines such as dimethylamine and aldehydes, preferably formaldehyde, or ketones such as acetone, methyl ethyl ketone or cyclohexanone and phenols such as phenol nonylphenol or bisphenol may also be used as catalysts. Examples of catalysts which include tertiary amines having hydrogen atoms reactive with isocyanate groups include triethanolamine, triisopropanolamine, N-methyldiethanolamine, N-ethyldiethanolamine, N,N-dimethylethanolamine and their reaction products with alkylene oxides such as propylene oxide and/or ethylene oxide.

Basic nitrogen compounds such as tetraalkylammonium hydroxides, alkali metal hydroxides such as sodium phenolate and alkali metal alcoholates such as sodium methylate may also be used as catalysts. Hexahydrotriazines are also suitable catalysts.

Organic metal compounds may also be used as catalysts according to the invention, in particular organic tin compounds. The organic tin compounds used are preferably tin (II) salts such as tin(II) acetate, tin(II) octoate, tin(II) ethyl hexoate and tin(II) laurate; and tin(IV) compounds such as dibutyl tin oxide, dibutyl tin dichloride, dibutyl tin diacetate, dibutyl tin dilaurate, dioctyl tin dilaurylmercaptide, dibutyl tin maleate dioctyl tin diacetate, dimethyl tin dichloride, dimethyl tin dilaurate, or dimethyl tin dilauryl mercaptide. All the above-mentioned catalysts may, of course, be used as mixtures.

Salts of other metals may also be used as catalysts, in particular, organobismuth compounds such as bismuth 2-ethylhexanoate, bismuth neodecanoate and the like, organozirconium compounds such as tetrakis(2,4-pentanedionato)zirconium and the like, or organomercury compounds such as phenyl mercuric neodecanoate and the like.

Further examples of catalysts that may be used in accordance with one example of the present invention are described in Kunststoff-Handbuch, Volume VII, published by Vieweg and Hochtlen, Carl-Hanser-Verlag, Munich 1966, pages 96 to 102, each of which are incorporated herein by reference in its entirety.

The catalysts, when used, are generally used in a quantity of between about 0.001 and 10%, by weight, based on the quantity of reactants. Any other suitable catalyst may be used. For example, catalysts are listed in U.S. Pat. Nos. 5,229,427 and 7,211,616, each of which is incorporated herein by reference in its entirety.

In another example, about 0.05 weight percent based on vegetable oil content of catalyst may be added. In this example, the catalyst comprises about 33% weight triethylene diamine of the catalyst and about 67% weight dipropyleneglycol of the catalyst at room temperature. Optionally, the method may further comprise adding about 0.2 weight percent based on vegetable oil content of antioxidant at room temperature to the mixture.

As discussed in greater detail below, the hydroxyl terminated precursor may be then used as the B-side reactant alone or blended with additional polyol(s), catalyst(s) and additives as B-side reactants and then mixed with an A-side reactant using standard petrochemical isocyanates. It has been found that this produces a relatively high quality polyurethane foam. Depending on the choice of isocyanate, and other B-side reactants, the foam is suitable for a number of applications ranging from automotive seating to rigid structural urethane parts.

A compound in accordance with one example of the present invention include formula A as follows:

wherein
R'=

Another compound in accordance with one example of the present invention include formula B as follows:
B is wherein

R=

$$HO(CHCH_2O)_x\overset{CH_3}{\underset{|}{\phantom{C}}}\!\!\!\!—$$

Yet another compound in accordance with one example of the present invention include formula C as follows:
C is wherein R' is and
R is

In another embodiment, R' may represent the following formula:

In another example, the present invention provides a method of making a polyurethane product from a hydroxyl terminated precursor. As mentioned above, polyurethane foam may be prepared by reacting what is known as an A-side reactant (or A-side reactants) with what is known as a B-side reactant (or B-side reactants). The A-side reactant is generally considered to include at least one isocyanate. The B-side reactant may comprise the hydroxyl terminated precursor alone but generally is a solution or mixture of an isocyanate-reactive component, such as a polyol and optionally catalyst(s) and/or additive(s).

The method comprises forming the hydroxyl terminated precursor as described herein. The hydroxyl terminated precursor may be used as the B-side reactant. The method further comprises mixing a base isocyanate with a catalyst (mentioned above) and optionally any additive to define an isocyanate mixture. In this example, catalysts may or may not be added to the isocyanate mixture except for isocyanato terminated prepolymers where catalysts are frequently used in their preparation. The catalysts to accelerate the polyurethane reaction may be added to the B-side reactants which will include hydroxyl terminated precursor for one example of the present invention and optionally additional polyol(s), optionally additive(s) (such as crosslinkers or chain extenders, surfactants, water, blowing agents, pigments, etc.) and optionally catalyst(s). The isocyanate mixture may be used as the A-side reactant. It is to be noted that isocyanate mixtures are mixtures or solutions of different types of isocyanates or isomers. Optionally, some A-side reactants may contain surfactants, flame-retardants, special additives or diluents or in some cases additional catalyst may be added. The isocyanate mixture (A-side reactants) may have a weight ratio with the hydroxyl terminated precursor and optionally other B-side reactants so that the isocyanato content of the isocyanate mixture in equivalent units is between about 100:80 and 60:100 to the active hydrogen content in equivalent units in the hydroxyl terminated precursor and optionally other B-side reactants.

In this example, the isocyanate, A-side reactant, (or reactants) is (are) then mixed with the B-side reactants containing the hydroxyl terminated precursor plus optionally additional polyol(s), catalyst(s) and additive(s) at a predetermined pressure and a temperature of between about 20 and 50 degrees Celsius, defining a liquid polyurethane mixture. In one example, the predetermined pressure may be up to about 2 atmospheres, depending on the apparatus. However, in another example, the predetermined pressure may be between about 1500 and 3000 pounds per square inch gauge.

The liquid polyurethane mixture may then be injected or poured in a cavity of a mold. The polyurethane mixture reacts in situ to form the polyurethane product. That is, in the cavity, the liquid polyurethane mixture reacts and for foam formulations rises to fill the cavity and form the polyurethane product in situ. For non-foam formulations, the liquid polyurethane mixture fills the cavity to the volume injected or poured and then cures to a solid to form the polyurethane product in situ. In this example, the mold may be made of aluminum, polymeric material, or steel, or any other suitable material. After a defined period of time, the polyurethane product is removed from the mold, thereby retaining the predetermined shape.

Figure 1A:
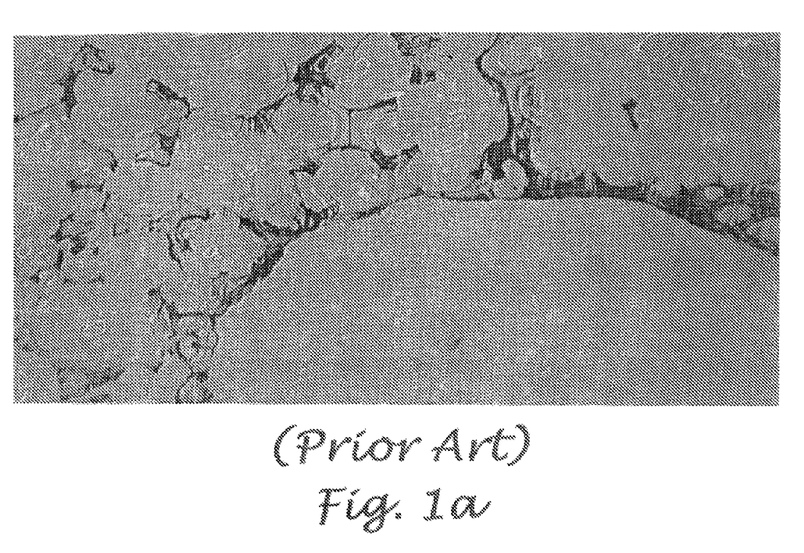
FIG. 1a is a micrograph of a prior art polyurethane foam.
Figure 1B:
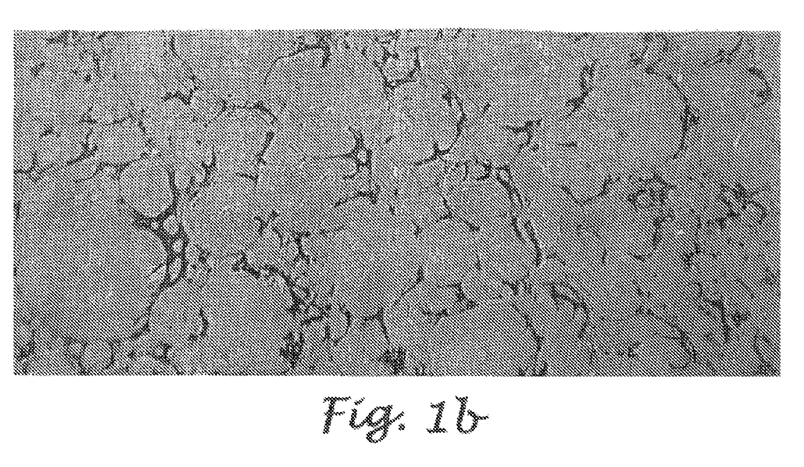
FIG. 1b is a micrograph of a polyurethane foam made by reacting B-side reactants in a mixture containing a hydroxyl terminated precursor in accordance with one example of the present invention.

FIGS. 1a and 1b illustrate a comparison between a prior art polyurethane foam and a polyurethane foam made in accordance with an example of the present invention. FIG. 1a depicts a prior art polyurethane foam made from made from a TDI based isocyanate. More specifically, the prior art polyurethane foam of FIG. 1a was made by reacting B-side reactants containing about 7% polymerized, oxidized soybean oil based on the total B-side reactants in a mixture of standard petrochemical based molding polyether polyols, catalysts and additives with A-side reactants of 80/20% 2,4-, 2,6-tolylenediisocyanate. As shown, the cell structure of the prior art polyurethane foam is relatively coarse and highly irregular. Moreover, the foam tends to have a "tight" and "dead" feel.

FIG. 1b shows a polyurethane foam made from the hydroxyl terminated precursor in accordance with one example of the present invention. More specifically, the polyurethane foam of FIG. 1b was made by reacting B-side reactants in a mixture containing a hydroxyl terminated precursor in accordance with one example of the present invention, petrochemical based molding polyether polyols, catalysts and additives with A-side reactants of 80/20% 2,4-, 2,6-tolylenediisocyanate. The hydroxyl terminated precursor in the foam depicted by FIG. 1b contains about 7% polymerized, oxidized soybean oil based on the total B-side reactants. As depicted, the cell structure of the polyurethane foam is relatively fine and significantly more consistent. Additionally, the foam tends to have an open and resilient "flexible" feel.

Furthermore, it is understood that the hydroxyl terminated precursor may be used alone as the B-side reactant.

EXAMPLE

This example provides a method of making a hydroxyl terminated precursor to be used in making a polyurethane product. About 1 weight percent of polypropylene glycol (Pluracol™ P-1010 by BASF) mixture with about 0.04 weight percent antioxidant (Irganox™ 245 by Ciba Specialty Chemicals) was predispersed in a separate mixing container to define a polypropylene glycol-antioxidant blend. The polypropylene glycol-antioxidant blend was heated to about 65 degrees Celsius.

About 16 weight percent of a modified soybean oil (polymerized, oxidized), Soyol™ R2-052, from Urethane Soy Systems Company of Volga, S. Dak. was weighed and loaded into a lined, open reactor vessel equipped with a band style heater and a Patterson mixer. The mixer was turned on low and the batch heated to about 25 degrees Celsius. About 7 weight percent of polypropylene glycol (Pluracol™ P-1010 by BASF) at room temperature was added to the batch.

The polypropylene glycol-antioxidant blend was then added to the batch, and the batch was mixed and heated to between about 39 and 44 degrees Celsius. The batch was maintained at a temperature no higher than about 45 degrees Celsius. As mixing continued, about 1.452 weight percent of 1,1'-methylenebis[isocyanatobenzene] (MDI) labeled MONDUR ML™ by Bayer MaterialScience was charged to the batch. About 5 minutes after the MDI was added, about 0.008 weight percent triethylene diamine catalyst dispersed in dipropyleneglycol (Dabco™ 33LV by Air Products) was added to the batch. For about 20 to 30 minutes, the batch was continuously mixed and held at a batch temperature of between about 45 and 51 degrees Celsius. The batch temperature did not exceed 55 degrees Celsius and the reaction time did not exceed about 40 minutes.

Then, about 74.5 weight percent polyoxyethylene-polyoxypropylene copolymer polyol, Dow DVV6340™ by Dow Chemical, was added to the batch. Heating was stopped and mixing was continued for about 60 minutes.

The reaction batch containing the hydroxyl terminated precursor was cooled to room temperature and was then was sealed in a storage container. The hydroxyl terminated precursor was ready to be used in making a polyurethane product.

While the present invention has been described in terms of preferred embodiments, it will be understood, of course, that the invention is not limited thereto since modifications may be made to those skilled in the art, particularly in light of the foregoing teachings.

The invention claimed is:

1. A method of making a flexible polyurethane, the method comprising:
providing B-side reactants comprising a hydroxyl terminated precursor, the hydroxyl terminated precursor being made by providing a vegetable oil-polyol mixture of modified vegetable oil containing about two or more hydroxyl groups per molecule and a polyether polyol having about two or more hydroxyl groups per molecule at a temperature of at least about 25 degrees Celsius and at a pressure of about 1 atmosphere, the mixture having a hydroxyl equivalent ratio of about 1:1 vegetable oil to polyol, and mixing a first isocyanate containing about two or more isocyanato groups per molecule at a temperature of about 25 degrees Celsius and at a pressure of up to about 1 atmosphere with the vegetable oil-polyol mixture at a molar equivalent ratio of at least 2:1 vegetable oil-polyol mixture to first isocyanate to react the isocyanate with the mixture for at least 10 minutes to form the hydroxyl terminated precursor; and
reacting the hydroxyl terminated precursor with A-side reactants comprising a second isocyanate to form a flexible polyurethane, wherein the weight ratio of the isocyanate content of the A-side reactants in equivalent units is between about 60:100 and 100:80 to the active hydrogen content in equivalent units in the B-side reactants.

2. The method of claim 1 wherein the first isocyanate is at least one of 1,1'-methylenebis[isocyanatobenzene] and all isomers, polymethylenepolyphenylene isocyanate, and any isomer or isomer ratio of tolylene diisocyanate.

3. The method of claim 1 wherein mixing comprises:
adding the first isocyanate to the vegetable oil-polyol mixture;
reacting the first isocyanate with the vegetable oil-polyol mixture to form the hydroxyl terminated precursor; and
mixing additional polyol with the vegetable oil-polyol mixture.

4. The method of claim 1 wherein the vegetable oil-polyol mixture is at a temperature of between about 35 and 50 degrees Celsius.

5. The method of claim 1 wherein the first isocyanate is at a temperature of about 25 degrees Celsius.

6. The method of claim 1 wherein the step of providing B-side reactants further comprises cooling the hydroxyl terminated precursor to room temperature.

7. The method of claim 1 wherein mixing reacts the first isocyanate with the vegetable oil-polyol mixture to define the hydroxyl terminated precursor in a reaction as follows:

where n, m > or =1
wherein (HO)$_n$—R—OH represents polyether polyol, HO—R'—(OH)$_m$ represents oxidized, polymerized soybean oil, and OCN-Ar-NCO represents 1,1'-methylenebis[isocyanatobenzene].

8. The method of claim 1 wherein the step of providing B-side reactants further comprises adding about 0.3 weight percent based on vegetable oil content of antioxidant at room temperature to the mixture.

9. The method of claim 1 wherein the step of providing B-side reactants further comprises adding about 0.05 weight percent based on vegetable oil content of catalyst, the catalyst comprising about 33% weight triethylene diamine of the catalyst and about 67% weight dipropyleneglycol of the catalyst at room temperature.

10. The method of claim 1 wherein the step of providing B-side reactants further comprises adding about zero to about 500 weight percent based on vegetable oil content of a polyoxyethylene-oxypropylene copolymer polyol after mixing the first isocyanate with the vegetable oil-polyol mixture.

11. A method of making a flexible polyurethane, the method comprising:
providing B-side reactants comprising a hydroxyl terminated precursor, the hydroxyl terminated precursor being made by heating a vegetable oil-polyol mixture of modified vegetable oil containing about two or more hydroxyl groups per molecule and a polyether polyol having about two or more hydroxyl groups per molecule at a temperature of between about 35 and 50 degrees Celsius and at a pressure of about 1 atmosphere, the mixture having a hydroxyl equivalent ratio of about 1:1 vegetable oil to polyol, adding a first isocyanate containing about two or more isocyanato groups per molecule to the vegetable oil-polyol mixture, the first isocyanate being at a temperature of at least about 25 degrees Celsius to the mixture at a molar equivalent ratio of at least 2:1 vegetable oil-polyol mixture to first isocyanate, mixing the first isocyanate and the vegetable oil-polyol mixture to react the first isocyanate with the mixture for at least about 10 minutes to form the hydroxyl terminated precursor, and adding additional polyol to the isocyanate and the vegetable oil-polyol mixture; and reacting the hydroxyl terminated precursor with A-side reactants comprising a second isocyanate to form a flexible polyurethane, wherein the weight ratio of the isocyanate content of the A-side reactants in equivalent units is between about 60:100 and 100:80 to the active hydrogen content in equivalent units in the B-side reactants.

12. The method of claim 11 wherein the first isocyanate is at least one of 1,1'-methylenebis[isocyanatobenzene], polymethylenepolyphenylene isocyanate, and any isomer or isomer ratio of tolylenediisocyanate, wherein the first isocyanate is at a temperature of about 25 degrees Celsius or higher.

13. The method of claim 11 wherein the step of providing B-side reactants further comprises cooling the hydroxyl terminated precursor to room temperature.

14. The method of claim 1 wherein mixing reacts the first isocyanate with the vegetable oil-polyol mixture to define the hydroxyl terminated precursor as follows:

where n, m ≥ 1 wherein R is a polyoxypropylene polymer or polyoxyethylene-polyoxypropylene polymer group; R' is a modified vegetable oil group; and Ar is a bisphenyl methylene or methylbenzene group.

15. The method of claim 11 wherein the step of providing B-side reactants further comprises adding about 0.3 weight percent based on vegetable oil content of antioxidant at room temperature to the mixture.

16. The method of claim 11 wherein the step of providing B-side reactants further comprises adding about 0.05 weight percent based on vegetable oil content of catalyst, the catalyst comprising about 33% weight triethylene diamine of the catalyst and about 67% weight dipropyleneglycol of the catalyst at room temperature, and further comprising adding up to about 500 weight percent based on vegetable oil content of a polyoxyethylene-oxypropylene copolymer polyol after mixing the first isocyanate with the vegetable-polyol mixture.

17. The method of claim 1 wherein the hydroxyl terminated precursor is formed in the absence of a blowing agent.

18. The method of claim 1 wherein the modified vegetable oil comprises a polymerized, oxidized vegetable oil.

19. The method of claim 11 wherein the hydroxyl terminated precursor is formed in the absence of a blowing agent.

20. The method of claim 11 wherein the modified vegetable oil comprises a polymerized, oxidized vegetable oil.

21. The method of claim 1 wherein the hydroxyl terminated precursor contains, on average, two carbamate groups and at least two hydroxyl groups.

22. A method of making a flexible polyurethane, the method comprising:

providing B-side reactants comprising a hydroxyl terminated precursor, the hydroxyl terminated precursor being made by providing a vegetable oil-polyol mixture of modified soybean oil containing about two or more hydroxyl groups per molecule and a polyether polyol having about two or more hydroxyl groups per molecule, the mixture having a hydroxyl equivalent ratio of about 1:1 vegetable oil to polyol, heating the vegetable oil-polyol mixture to a temperature of between about 35 and 50 degrees Celsius and at a pressure of about 1 atmosphere, and mixing a first isocyanate containing about two or more isocyanato groups per molecule at a temperature between about 25 and 50 degrees Celsius and a pressure of about 1 atmosphere to the vegetable oil-polyol mixture at a molar equivalent ratio of at least 2:1 vegetable oil-polyol mixture to first isocyanate to react the first isocyanate with the mixture for at least about 10 minutes to form the hydroxyl terminated precursor, wherein the hydroxyl terminated precursor is formed in the absence of a blowing agent, wherein mixing reacts the first isocyanate with the vegetable oil-polyol mixture to define the hydroxyl terminated precursor in a reaction as follows:

where n, m > or =1 wherein $(HO)_n$—R—OH represents polyether polyol, HO—R'—$(OH)_m$ represents oxidized, polymerized soybean oil, and OCN-Ar-NCO represents 1,1'-methylenebis [isocyanatobenzene]; and reacting the hydroxyl terminated precursor with A-side reactants comprising a second isocyanate to form a flexible polyurethane, wherein the weight ratio of the isocyanate content of the A-side reactants in equivalent units is between about 60:100 and 100:80 to the active hydrogen content in equivalent units in the B-side reactants.

* * * * *